J. G. Perry.
Meat Cutter.
N° 83,308. Patented Oct. 20, 1868.
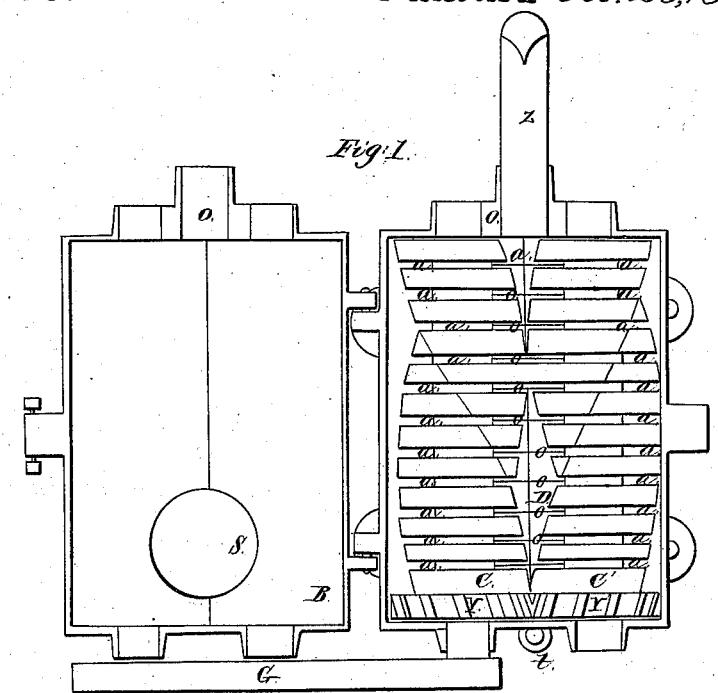
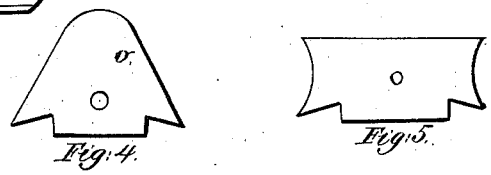
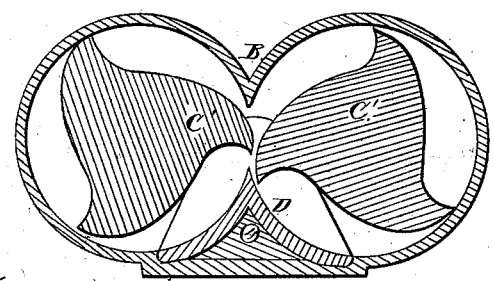
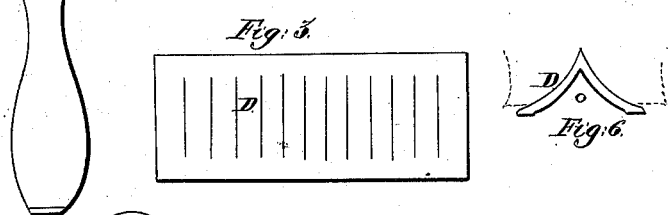
Witnesses.
Benjamin Arnold
Henry N Porter
Inventor
John G. Perry

JOHN G. PERRY, OF KINGSTON, RHODE ISLAND.

Letters Patent No. 83,308, dated October 20, 1868.

IMPROVED MEAT-CUTTER.

The Schedule referred to in these Letters Patent and making part of the same.

To all whom it may concern:

Be it known that I, JOHN G. PERRY, of Kingston, in the county of Washington, and State of Rhode Island, have invented certain new and useful Improvements in Meat-Cutters; and I do hereby declare the following to be a full and correct description thereof, reference being had to the accompanying drawings, forming part of this specification, and to the letters of reference marked thereon, the same letters being used in all the figures to denote the same parts.

Figure 1 is a top view of the cutter, with the case open.

Figure 2 is a vertical cross-section, taken through in the direction of the red line in fig. 1.

Figure 3 is a bottom view of the plate that holds the knives, and end view of the same.

Figure 4 is the shape of the knife-blades.

Figure 5 is another-shaped blade that may be used.

Figure 6 is a perspective view of the plate for holding the knives.

The construction is as follows:

A case, B, made in the shape of two hollow cylinders, placed side by side, having in each division a spiral-flanged cylinder C C', turning in bearings in the ends of the case.

These spiral-flanged cylinders are scored with grooves $a\ a\ a$, which are either cut or cast in the flanges.

In a recess, in the bottom of the case, a curved or hollow plate, D, is fitted, in which grooves are cast or cut, to hold the knives $o\ o\ o$, which project up into the grooves in the cylinders.

A rod, $t$, is put in through the end of the case, and passing in through the knives, helps to hold them in place.

J J' are gear-wheels, which connect the two cylinders together, and which are made spiralling, to prevent the meat from staying in them, and clogging their motion.

S is a hopper, to receive the meat, and a nozzle, $z$, is put into the discharging-aperture O, to hold the skins or cases, when the machine is used as a sausage-filler.

It will be seen, by reference to the drawing, fig. 3, that, by making the plate D hollow and thin, as shown, the grooves may be cast or cut through, and at the same time give a support to the knives, across their breadth, thus having all the advantages of thick, solid blocks to hold the knives all in one piece, with every facility for removing the knives in case of breakage, or for sharpening.

The operation is as follows:

Motion being given to the cylinder, by turning the crank G, and the pieces of meat put into the hopper S, the flanges of the cylinders will carry them down across the knives, by which they will be cut up fine, and the spiral shape of the flanges will gradually work the mass of meat towards the other end of the case, where it will be discharged at the aperture O, through the tube $z$, into the cases, or into a dish, as may be preferred, without the tube or nozzle.

Having thus described my improved meat-cutter, What I claim as my invention, and desire to secure by Letters Patent, is—

The curved or hollow plate D, with openings, made substantially as described, for the purpose of holding the knives of a meat-cutter.

JOHN G. PERRY.

Witnesses:
BENJAMIN ARNOLD,
HORACE N. FOSTER.